(12) United States Patent
Kumar

(10) Patent No.: US 11,737,170 B2
(45) Date of Patent: Aug. 22, 2023

(54) OPERATION IN A SWITCHED UPLINK MODE

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/208,948

(22) Filed: Mar. 22, 2021

(65) Prior Publication Data
US 2022/0304112 A1 Sep. 22, 2022

(51) Int. Cl.
| | | |
|---|---|---|
| *H04W 88/06* | (2009.01) | |
| *H04B 7/0413* | (2017.01) | |
| *H04B 7/06* | (2006.01) | |
| *H04L 5/00* | (2006.01) | |
| *H04W 72/0453* | (2023.01) | |
| *H04W 72/23* | (2023.01) | |
| *H04W 8/24* | (2009.01) | |

(52) U.S. Cl.
CPC .......... *H04W 88/06* (2013.01); *H04B 7/0413* (2013.01); *H04B 7/063* (2013.01); *H04B 7/0639* (2013.01); *H04L 5/001* (2013.01); *H04L 5/0094* (2013.01); *H04W 72/0453* (2013.01); *H04W 72/23* (2023.01); *H04W 8/24* (2013.01)

(58) Field of Classification Search
CPC . H04W 88/06; H04W 72/0453; H04W 72/23; H04W 8/24; H04B 7/0413; H04B 7/063; H04B 7/0639; H04L 5/0094; H04L 5/001
See application file for complete search history.

(56) References Cited

U.S. PATENT DOCUMENTS

| | | | |
|---|---|---|---|
| 2016/0261308 A1* | 9/2016 | Khojastepour | ....... H04L 5/1461 |
| 2020/0044706 A1* | 2/2020 | Wernersson | ......... H04B 7/0486 |
| 2021/0392649 A1* | 12/2021 | Kim | ........................ H04W 8/22 |

* cited by examiner

*Primary Examiner* — Omar J Ghowrwal
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, configuration information associated with a switched uplink (SUL) mode in a network including the base station. The UE may transmit, based at least in part on the configuration information indicating that the SUL mode is supported in the network, a tracking update to receive a query associated with capabilities of the UE. Numerous other aspects are described.

15 Claims, 11 Drawing Sheets

OPERATION IN A SWITCHED UPLINK MODE

FIELD OF THE DISCLOSURE

Aspects of the present disclosure generally relate to wireless communication and to techniques and apparatuses for operation in a switched uplink (SUL) mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, configuration information associated with a switched uplink (SUL) mode in a network including the base station; and transmitting, based at least in part on the configuration information indicating that the SUL mode is supported in the network, a tracking update to receive a query associated with capabilities of the UE.

In some aspects, a method of wireless communication performed by a UE includes receiving, from a base station, configuration information associated with an SUL mode in a network including the base station; transmitting, based at least in part on the configuration information, capability information including information identifying one or more SUL band pairs supported by the UE and a respective coherence capability indication associated with a respective frequency band of each of the one or more SUL band pairs; and receiving, based at least in part on the capability information, an SUL configuration for the UE to operate in the SUL mode.

In some aspects, a method of wireless communication performed by a base station includes transmitting, to a UE, configuration information associated with an SUL mode in a network including the base station; receiving, from the UE, capability information including information identifying one or more SUL band pairs supported by the UE and a respective coherence capability indication associated with a respective frequency band of each of the one or more SUL band pairs; and transmitting, based at least in part on the capability information, an SUL configuration for the UE to operate in the SUL mode.

In some aspects, a UE for wireless communication includes a memory and one or more processors, operatively coupled to the memory, configured to: receive, from a base station, configuration information associated with an SUL mode in a network including the base station; and transmit, based at least in part on the configuration information indicating that the SUL mode is supported in the network, a tracking update to receive a query associated with capabilities of the UE.

In some aspects, a UE for wireless communication includes a memory and one or more processors, operatively coupled to the memory, configured to: receive, from a base station, configuration information associated with an SUL mode in a network including the base station; transmit, based at least in part on the configuration information, capability information including information identifying one or more SUL band pairs supported by the UE and a respective coherence capability indication associated with a respective frequency band of each of the one or more SUL band pairs; and receive, based at least in part on the capability information, an SUL configuration for the UE to operate in the SUL mode.

In some aspects, a base station for wireless communication includes a memory and one or more processors, operatively coupled to the memory, configured to: transmit, to a UE, configuration information associated with an SUL mode in a network including the base station; receive, from the UE, capability information including information identifying one or more SUL band pairs supported by the UE and a respective coherence capability indication associated with a respective frequency band of each of the one or more SUL band pairs; and transmit, based at least in part on the capability information, an SUL configuration for the UE to operate in the SUL mode.

In some aspects, a non-transitory computer-readable medium storing a set of instructions for wireless communication includes one or more instructions that, when executed by one or more processors of a UE, cause the UE to: receive, from a base station, configuration information associated with an SUL mode in a network including the base station; and transmit, based at least in part on the configuration information indicating that the SUL mode is supported in the network, a tracking update to receive a query associated with capabilities of the UE.

In some aspects, a non-transitory computer-readable medium storing a set of instructions for wireless communication includes one or more instructions that, when executed by one or more processors of a UE, cause the UE to: receive, from a base station, configuration information associated with an SUL mode in a network including the base station; transmit, based at least in part on the configuration information, capability information including information identifying one or more SUL band pairs supported by the UE and a respective coherence capability indication associated with a respective frequency band of each of the one or more SUL band pairs; and receive, based at least in part on the capability information, an SUL configuration for the UE to operate in the SUL mode.

In some aspects, a non-transitory computer-readable medium storing a set of instructions for wireless communication includes one or more instructions that, when executed by one or more processors of a base station, cause the base station to: transmit, to a UE, configuration information associated with an SUL mode in a network including the base station; receive, from the UE, capability information including information identifying one or more SUL band pairs supported by the UE and a respective coherence capability indication associated with a respective frequency band of each of the one or more SUL band pairs; and transmit, based at least in part on the capability information, an SUL configuration for the UE to operate in the SUL mode.

In some aspects, an apparatus for wireless communication includes means for receiving, from a base station, configuration information associated with an SUL mode in a network including the base station; and means for transmitting, based at least in part on the configuration information indicating that the SUL mode is supported in the network, a tracking update to receive a query associated with capabilities of the UE.

In some aspects, an apparatus for wireless communication includes means for receiving, from a base station, configuration information associated with an SUL mode in a network including the base station; means for transmitting, based at least in part on the configuration information, capability information including information identifying one or more SUL band pairs supported by the UE and a respective coherence capability indication associated with a respective frequency band of each of the one or more SUL band pairs; and means for receiving, based at least in part on the capability information, an SUL configuration for the UE to operate in the SUL mode.

In some aspects, an apparatus for wireless communication includes means for transmitting, to a UE, configuration information associated with an SUL mode in a network including the base station; means for receiving, from the UE, capability information including information identifying one or more SUL band pairs supported by the UE and a respective coherence capability indication associated with a respective frequency band of each of the one or more SUL band pairs; and means for transmitting, based at least in part on the capability information, an SUL configuration for the UE to operate in the SUL mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
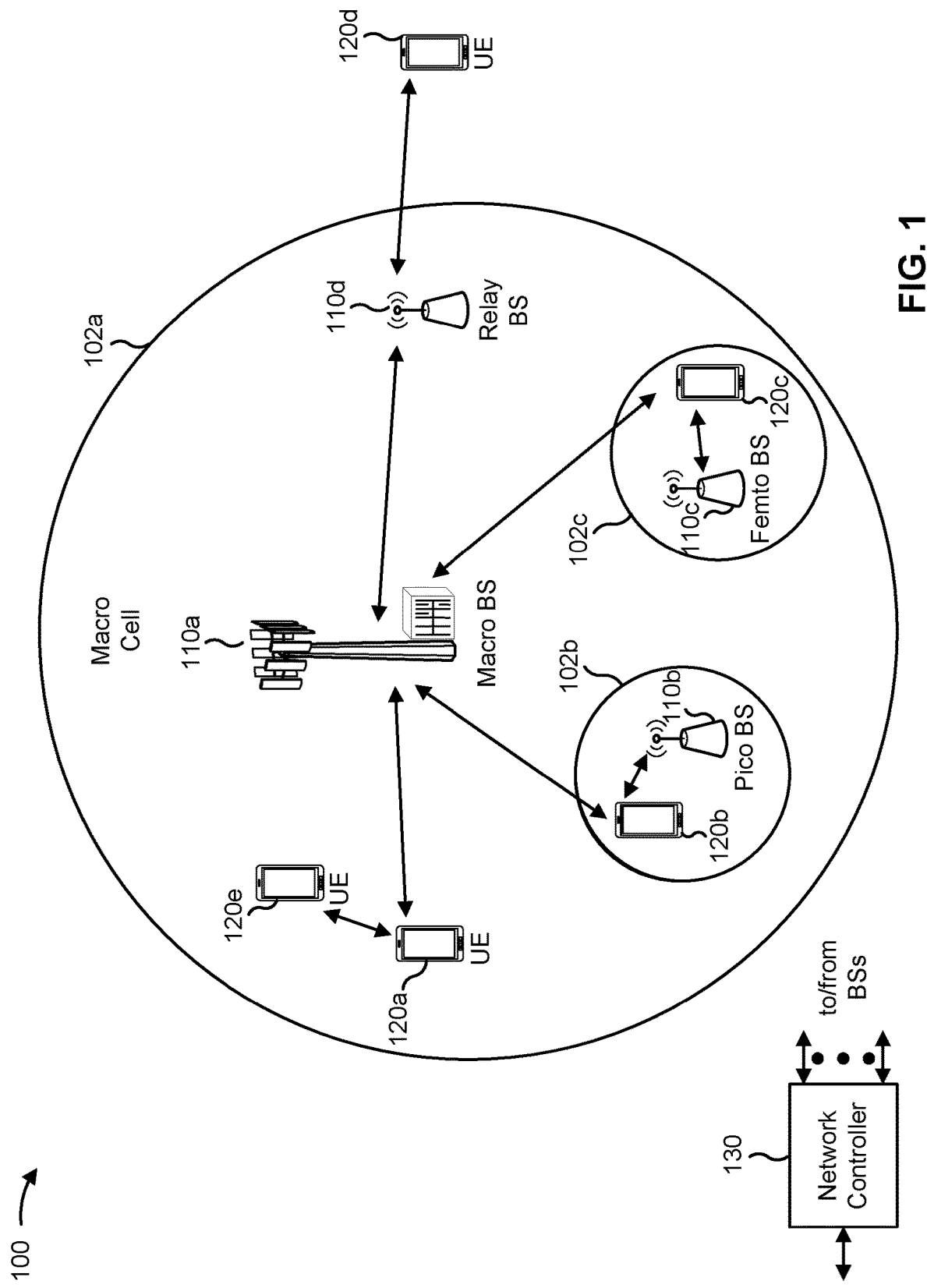
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
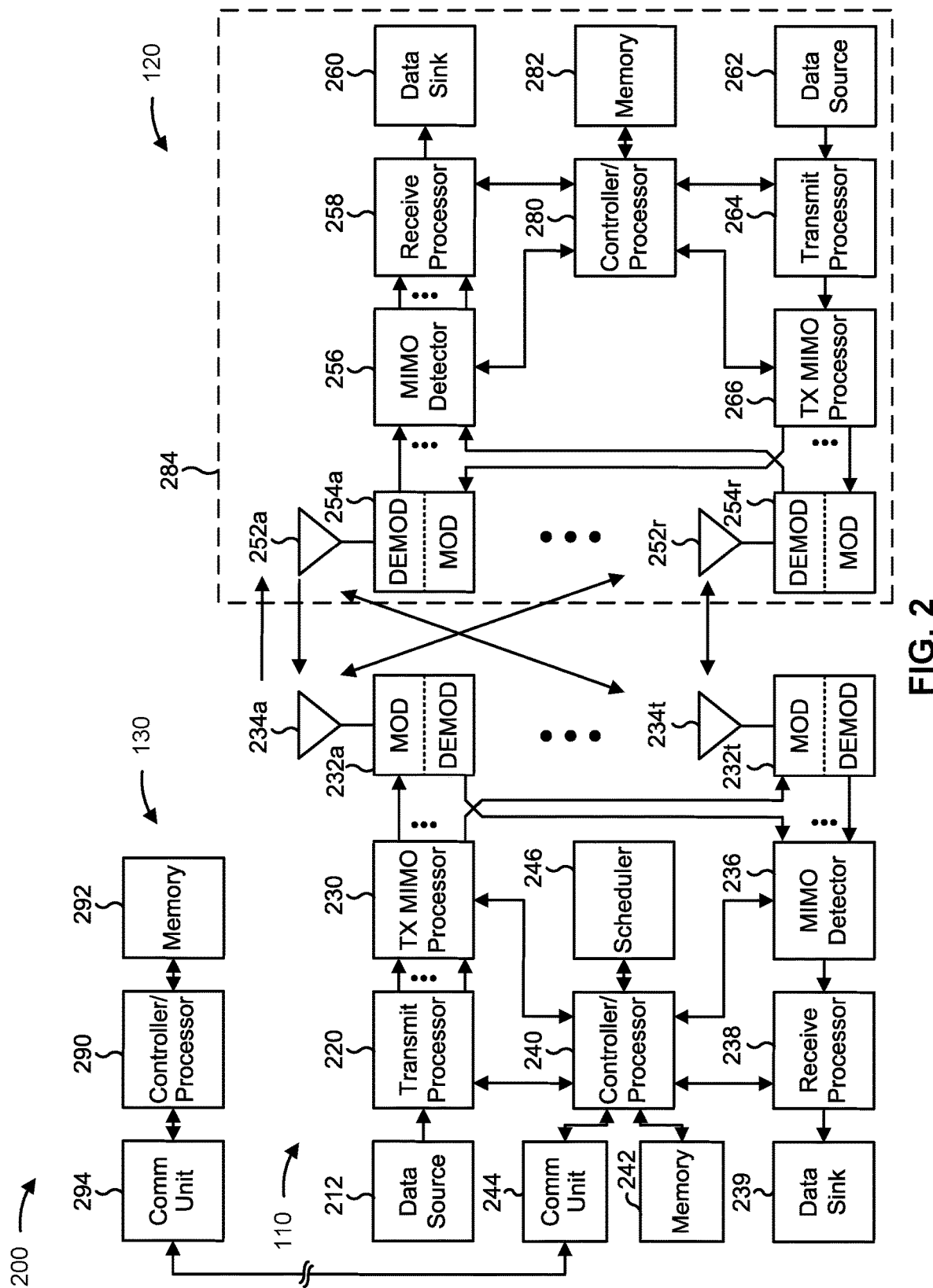
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with operation in an SUL mode, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving, from a base station, configuration information associated with an SUL mode in a network including the base station; and/or means for transmitting, based at least in part on the configuration information indicating that the SUL mode is supported in the network, a tracking update to receive a query associated with capabilities of the UE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting information identifying one or more SUL band pairs supported by the UE when the configuration information indicates that the SUL mode is supported in the network; and/or means for transmitting a coherence capability indication indicating a capability of the UE to perform coherent uplink MIMO transmission in a frequency band associated with the one or more SUL band pairs.

In some aspects, the UE includes means for receiving the query associated with capabilities of the UE; and/or means for transmitting an updated coherence capability indication to update a previous coherence capability indication.

In some aspects, the UE includes means for receiving a dynamic indication from the base station to begin operating in the SUL mode.

In some aspects, the UE includes means for performing coherent uplink MIMO transmission, while operating in the SUL mode, over a physical uplink shared channel.

In some aspects, the UE includes means for determining, based at least in part on a transmit precoding matrix indicator, whether the base station is expecting the UE to perform coherent uplink MIMO transmission in a frequency band associated with the SUL mode.

In some aspects, the UE includes means for communicating, when operating in the SUL mode, utilizing an SUL band pair including a first frequency band and a second frequency band, the communicating including performing coherent uplink MIMO transmission in the second frequency band.

In some aspects, the UE includes means for receiving, from a base station, configuration information associated with an SUL mode in a network including the base station; means for transmitting, based at least in part on the configuration information, capability information including information identifying one or more SUL band pairs supported by the UE and a respective coherence capability indication associated with a respective frequency band of each of the one or more SUL band pairs; and/or means for receiving, based at least in part on the capability information, an SUL configuration for the UE to operate in the SUL mode. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a coherence capability of the UE based at least in part on a transceiver design associated with the UE.

In some aspects, the UE includes means for determining a coherence capability of the UE by determining whether a transceiver design associated with the UE provides a first transmission chain for transmission in a first frequency band and a plurality of transmission chains for uplink MIMO transmission in a second frequency band.

In some aspects, the UE includes means for receiving a dynamic indication from the base station to begin operating in the SUL mode.

In some aspects, the base station includes means for transmitting, to a UE, configuration information associated with an SUL mode in a network including the base station; means for receiving, from the UE, capability information including information identifying one or more SUL band pairs supported by the UE and a respective coherence capability indication associated with a respective frequency band of each of the one or more SUL band pairs; and/or means for transmitting, based at least in part on the capability information, an SUL configuration for the UE to operate in the SUL mode. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining, based at least in part on the capability information, the SUL configuration for the UE, the SUL configuration indicating an SUL band pair, from among the one or more SUL band pairs, in which the UE is to perform uplink MIMO transmission.

In some aspects, the base station includes means for determining the SUL configuration based at least in part on a preference to configure the UE to use an SUL band pair associated with a coherence capability indication that indicates that the UE is capable of performing coherent uplink MIMO transmission in a frequency band that supports MIMO of the SUL band pair.

In some aspects, the base station includes means for transmitting a dynamic indication to the UE to begin operating in the SUL mode.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
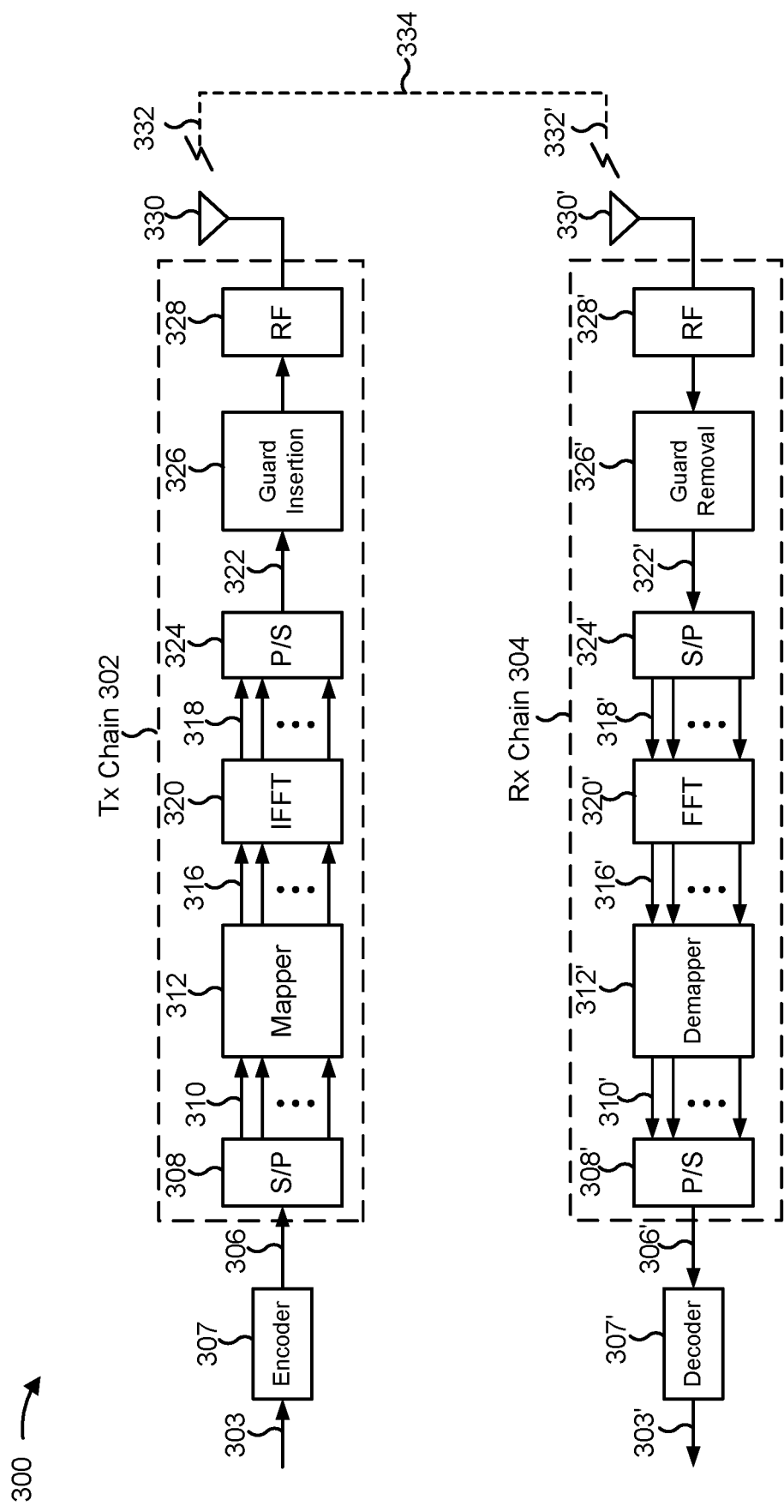
FIG. 3 is a diagram illustrating an example of a transmit chain and a receive chain of a UE, in accordance with the present disclosure.

FIG. 3 is a diagram illustrating an example 300 of a transmit (TX) chain 302 and a receive (RX) chain 304 of a UE 120, in accordance with the present disclosure. In some aspects, one or more components of Tx chain 302 may be implemented in transmit processor 264, TX MIMO processor 266, MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, RX chain 304 may utilize OFDM/OFDMA. In some aspects, one or more components of Rx chain 304 may be implemented in receive processor 258, MIMO detector 256, MOD/DEMOD 254, and/or controller/processor 280, as described above in connection with FIG. 2. In some aspects, RX chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to RX chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The quantity and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
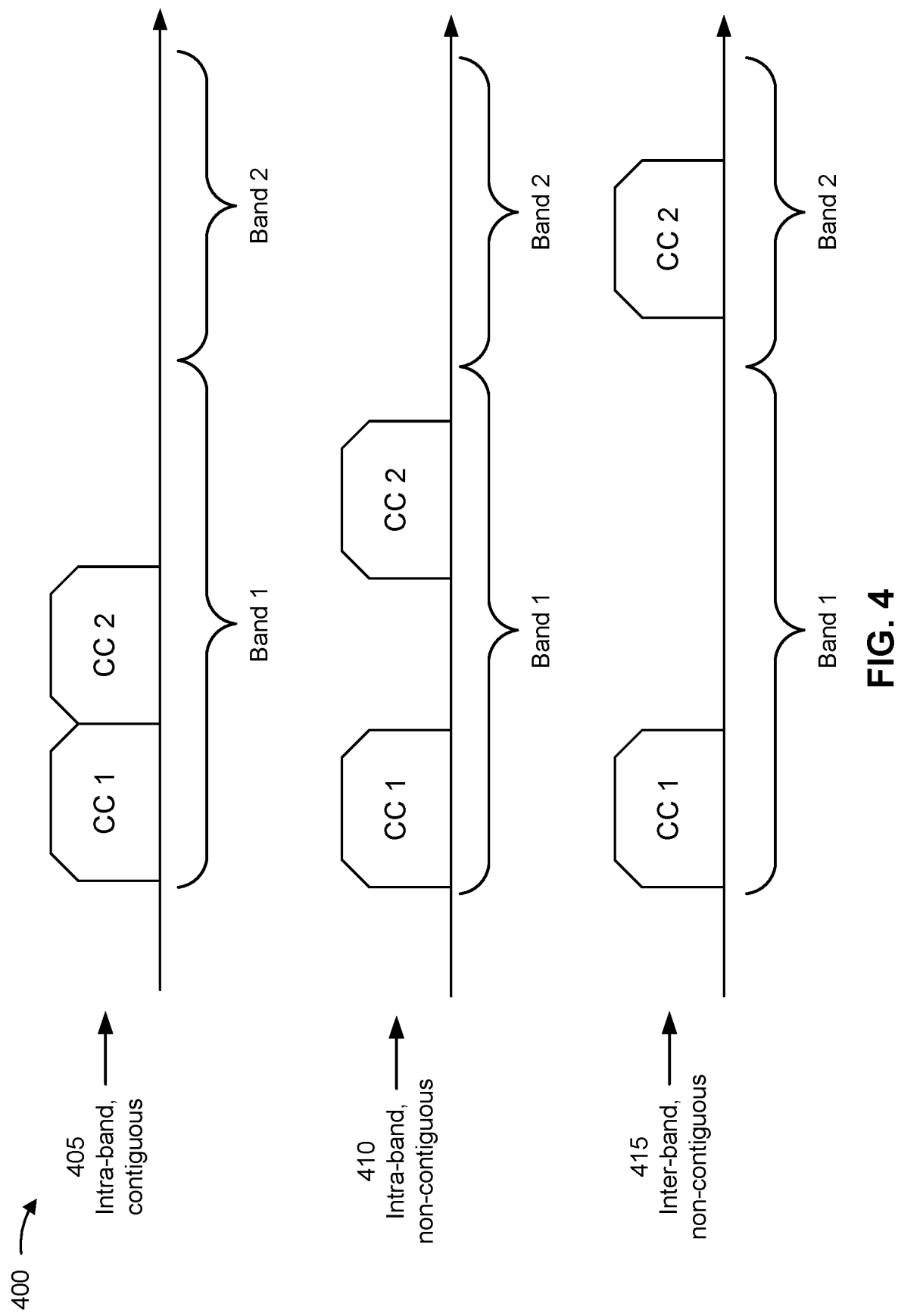
FIG. 4 is a diagram illustrating examples of carrier aggregation, in accordance with the present disclosure.

FIG. 4 is a diagram illustrating examples 400 of carrier aggregation, in accordance with the present disclosure. Carrier aggregation is a technology that enables two or more component carriers (CCs, sometimes referred to as carriers) to be combined (e.g., into a single channel) for a single UE to enhance data capacity. As shown, carriers can be combined in the same or different frequency bands. Additionally, or alternatively, contiguous or non-contiguous carriers can be combined. A base station may configure carrier aggregation for a UE, such as in a radio resource control (RRC) message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

A UE may conduct data communication (e.g., a data communication session) with a BS in a wireless network such as an LTE network or a 5G/NR network. The data communication may include downlink communications from the BS to the UE and uplink communications from the UE to the BS. The UE may include a transceiver design including two TX chains, respectively associated with two transmit antennas, to transmit the uplink communications to the BS.

During the data communication, the BS may dynamically indicate (e.g., transmit a dynamic indication) to the UE to operate in a switched uplink (SUL) mode (also referred to as super uplink mode). In the SUL mode, the UE may use carrier aggregation of a lower frequency band (e.g., a band that uses frequency division duplexing (FDD)) and a higher frequency band (e.g., a band that uses time division duplexing (TDD)) and support uplink (UL) multiple-input multiple-output (MIMO) transmission on the higher frequency band, while utilizing two TX chains. For example, in the SUL mode, a UE with a two TX chain hardware configuration may use carrier aggregation of an n1 band (e.g., an FDD band) and an n78 band (e.g., a TDD band) and support UL MIMO on the n78 band. In some examples, the SUL mode may be used in connection with carrier aggregation of an FDD band and a TDD band, as described above, or in connection with dual connectivity, such as Evolved Universal Mobile Telecommunications System Terrestrial Radio Access (E-UTRA)-New Radio (NR) dual connectivity (ENDC).

To support SUL, a UE may dynamically switch at least one TX chain for a first carrier to a second carrier (e.g., the UE may share at least one TX chain among carriers). For example, the UE may use a first TX chain for a first carrier and a second TX chain for a second carrier. As another example, the UE may use the first and second TX chains for the first carrier or the second carrier.

In the SUL mode, the UE may periodically switch between (i) transmitting aggregated uplink communications in a first frequency band (e.g., an n78 band) and a second frequency band (e.g., an n1 band) and (ii) performing UL MIMO transmission in the first frequency band. For instance, while operating in the SUL mode, the UE may utilize a first TX chain, from among the two TX chains, to transmit uplink communications in the first frequency band (e.g., the n78 band). Further, the UE may periodically switch utilizing a second TX chain, from among the two TX chains, to transmit uplink communications in the first frequency band (e.g., the n78 band) and in the second frequency band (e.g., the n1 band). The aggregation is achieved when the UE utilizes the first TX chain to transmit uplink communications in the first frequency band (e.g., the n78 band) and utilizes the second TX chain to transmit uplink communications in the second frequency band (e.g., the n1 band). The UL MIMO transmission is achieved when the UE utilizes the second TX chain to transmit in the first frequency band (e.g., the n78 band) because, during this time, the first TX chain and the second TX chain are transmitting in the first frequency band (e.g., the n78 band). The periodic switching may include periodically tuning a phase-locked loop (PLL) associated with the second TX chain to a first phase to transmit in the second frequency band (e.g., the n1 band) and retuning the PLL to a second phase to transmit in the first frequency band (e.g., the n78 band).

To enable improved performance (e.g., higher data rates) during the data communication, the UE may perform coherent UL MIMO transmission. To perform coherent UL MIMO transmission, the UE may maintain a substantially constant phase difference between the first phase and the second phase. That is, a difference in transmit power (e.g., amplitude) between the two TX chains and/or phase between the two TX chains needs to be maintained at a particular level in order to support coherent UL MIMO. The difference between transmit power and/or phase may be determined at a last (e.g., most recent) sounding reference signal (SRS) occasion of the UE (or at any other time point thereafter). Generally, coherent UL MIMO outperforms non-coherent UL MIMO only if the amplitude and/or phase difference between the two TX chains are coherent and do not change over time.

In some examples, the UE may indicate to the BS that the UE can perform coherent UL MIMO transmission. The BS may configure the data communication accordingly and may expect to receive coherent UL MIMO transmissions from the UE during the data communication. For example, the BS may configure the UE to use a two-layer precoding matrix for use in coherent UL MIMO.

In the SUL mode in which TX chains are switched between carriers, while retuning the PLL, the PLL may lock onto a random phase instead of the second phase to transmit in the first frequency band, as described above. In other words, the UE may not be able to maintain the substantially constant phase difference between the first TX chain and the second TX chain. As a result, the UE may not be able to perform coherent UL MIMO transmission, and may transmit non-coherent UL MIMO transmissions to the BS.

Because the BS expects to receive coherent UL MIMO transmissions from the UE, the BS may not adequately receive the non-coherent UL MIMO transmissions from the UE (e.g., if the UE does not maintain a constant phase difference between the two TX chains, the BS would not properly receive a transmission of the UE that used a precoding matrix for coherent UL MIMO). Consequently, the data communication between the BS and the UE may experience an interruption or a stoppage. The UE may have to retransmit the coherent UL MIMO transmissions to enable adequate reception of the coherent UL MIMO transmissions by the BS. Transmissions of the non-coherent UL MIMO transmissions and corrective coherent UL MIMO transmissions may result in inefficient utilization of network resources (e.g., bandwidth, subchannels, or the like) and UE resources (e.g., amount of processing, utilization of memory, power consumption, or the like).

Various aspects of techniques and apparatuses described herein may provide for operation in an SUL mode. In some aspects, the techniques and apparatuses described herein may enable a UE to indicate that the UE is capable of supporting coherent UL MIMO transmissions during the data communication between the UE and a BS. Further, upon being configured by the BS to operate in the SUL mode, the UE may be enabled to dynamically indicate that the UE is not capable of supporting coherent UL MIMO transmissions while operating in the SUL mode. In this way, the BS may configure the data communication accordingly and expect to receive non-coherent UL MIMO transmissions from the UE while the UE is operating in the SUL mode. As a result, the BS may adequately receive uplink communications from the UE while the UE is operating in the SUL mode, and the data communication between the BS and the UE may continue uninterrupted. Additionally, utilizing the techniques and apparatuses described herein may assist in avoiding unexpected non-coherent UL MIMO transmissions and corrective coherent UL MIMO transmissions, thereby enabling efficient utilization of network resources and UE resources. In some aspects, the UE may receive, from a BS, configuration information associated with the SUL mode in a network including the base station; and transmit, based at least in part on the configuration information, a tracking update to receive a query associated with capabilities of the UE.

Figure 5:
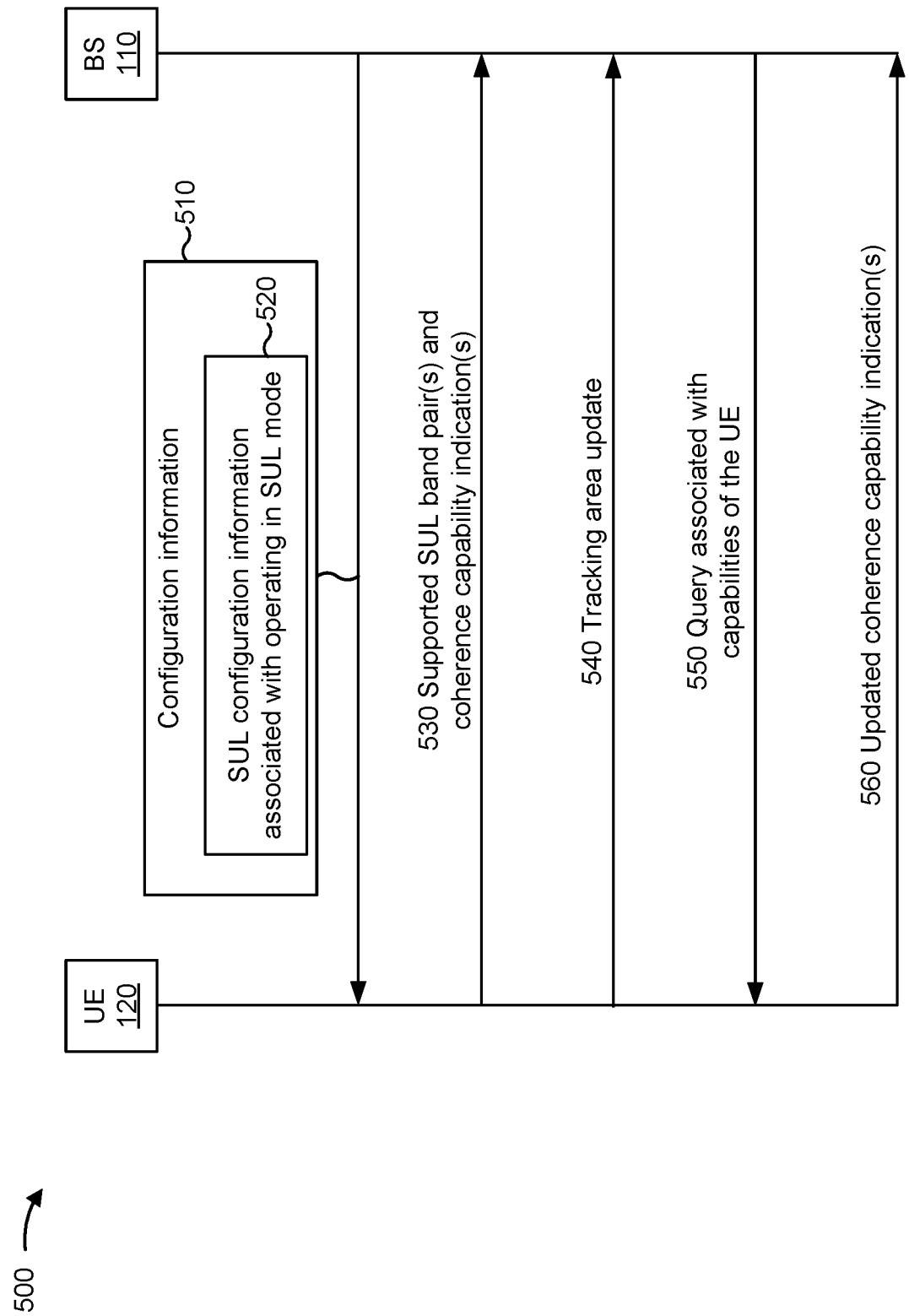
FIGS. 5-6 are diagrams illustrating examples associated with operation in a switched uplink (SUL) mode, in accordance with the present disclosure.

FIG. 5 is a diagram illustrating an example 500 associated with operation in an SUL mode, in accordance with the present disclosure. FIG. 5 shows a UE 120 and a BS 110 conducting data communication in, for example, an LTE network or a 5G/NR network. The data communication may include downlink communications from the BS 110 to the UE 120 and/or may include uplink communications from the UE 120 to the BS 110.

As shown by reference number 510, the BS 110 may transmit, and the UE 120 may receive, configuration information. The UE 120 may receive the configuration information at a beginning (e.g., during initiation) of the data communication. For example, the UE 120 may receive the configuration information during an attachment procedure with the BS 110 (e.g., for attachment of the UE 120 to the network). In some aspects, the UE 120 may receive the configuration information from a device other than the BS 110 (e.g., from another base station).

In some aspects, the UE 120 may receive the configuration information via, for example, a control channel (e.g., a physical downlink control channel (PDCCH)) between the UE 120 and the BS 110. The configuration information may be communicated via RRC signaling, MAC signaling (e.g., via a MAC control element (MAC-CE)), DCI signaling, or a combination thereof (e.g., RRC configuration of a set of values for a parameter and DCI indication of a selected value of the parameter). In some aspects, the configuration information may be included in a UE capability request (or enquiry) message.

As shown by reference number 520, the configuration information may include SUL configuration information associated with operation of the UE in the SUL mode. In some aspects, based at least in part on the SUL configuration information, the UE 120 may configure the UE 120 to operate in the SUL mode. In some aspects, the SUL configuration information may include an indication of, for example, one or more configuration parameters for the UE 120 to use to configure the UE 120 for the data communication. In some aspects, the SUL configuration information may include/indicate information associated with an SUL capability of a network including the base station. For instance, the SUL configuration information may indicate that the network (but not necessarily the BS 110) supports SUL operation. In some aspects, the SUL configuration information may include an information element (e.g., UlinkTxSwichRequest-r16) to indicate that the network supports SUL operation. Based at least in part on the SUL configuration information, the UE 120 may determine that the network, that includes the BS 110, supports SUL operation and/or that the BS 110 may trigger the UE 120 to operate in the SUL mode.

As shown by reference number 530, based at least in part on determining that the network supports SUL operation, the UE 120 may transmit to the BS 110 (e.g., in a UE capability information message) information identifying one or more SUL band pairs supported by the UE 120. In some aspects, an SUL band pair may include a pair of frequency bands (e.g., the n1 band and the n78 band, the n3 band and the n78 band, or the like) in which the UE 120 may operate in SUL mode. For example, an SUL band pair may include a relatively higher frequency band (e.g., a TDD band) and a relatively lower frequency band (e.g., an FDD band). In some aspects, the UE 120 may support an SUL band pair when the UE 120 may periodically switch between (i) transmitting aggregated uplink communications in a first frequency band (e.g., the n78 band) and a second frequency band (e.g., the n3 band) and (ii) performing UL MIMO transmission in the first frequency band. For instance, with respect to the SUL band pair including the n3 band and the n78 band, the UE 120 may operate in the SUL mode by utilizing a first TX chain to transmit uplink communications in the n78 band, and may periodically switch utilizing a second TX chain to transmit uplink communications in the n78 band and in the n3 band. In some aspects, the UE 120 may perform the UL MIMO transmission in the first frequency band (e.g., the n78 band), while operating in the SUL mode, over a physical uplink shared channel (PUSCH).

Further, based at least in part on determining that the network supports SUL operation, the UE 120 may transmit to the BS 110 (e.g., in the UE capability information message) a coherence capability indication indicating a capability of the UE 120 to perform coherent UL MIMO transmission in a given frequency band associated with the one or more SUL band pairs. For instance, the UE 120 may transmit a coherence capability indication indicating a capability of the UE 120 to perform coherent UL MIMO transmission in the n78 band associated with the SUL band pair including the n1 band and the n78 band, and with the SUL band pair including the n3 band and the n78 band. Based at least in part on receiving the coherence capability indication, the BS 110 may determine that the UE 120 is capable of performing coherent UL MIMO transmission during the data communication between the BS 110 and the UE 120, including while the UE 120 is operating in the SUL mode.

As a result, it is possible that the BS 110 may dynamically trigger, via a DCI-based grant, the UE 120 to operate in the SUL mode at some point during the data communication. In some aspects, the SUL configuration information (e.g., in an RRC configuration) may indicate whether the BS 110 is capable of triggering the UE 120 to operate in the SUL mode (e.g., trigger Tx chain switching). In some aspects, the UE 120 may determine whether the SUL configuration information indicates that the BS 110 is capable of dynamically triggering the UE 120 to operate in the SUL mode. For instance, based at least in part on information included in one or more information elements (e.g., UplinkTxSwitching-r16, UplinkTxSwithingOption-r16, or the like) of the SUL configuration information, the UE 120 may determine whether the BS 110 is capable of dynamically triggering the UE 120 to operate in the SUL mode.

The UE 120 may also reference UE-specific information in the SUL configuration information to determine whether the BS 110 has configured the UE 120 to operate in the SUL mode (e.g., in the near future). In other words, based at least in part on the UE-specific information, the UE 120 may determine that the BS 110 may dynamically trigger the UE 120 to operate in the SUL mode (e.g., in the near future).

In some aspects, the UE-specific information may indicate that the UE 120 is configured to perform UL MIMO transmission (e.g., for a MIMO-capable frequency band) that uses a two-layer configuration. For example, the UE-specific information may indicate a transmit precoding matrix indicator (TPMI). In some aspects, the UE 120 may determine whether the TPMI indicates that the BS 110 is expecting the UE 120 to perform coherent UL MIMO transmission (e.g., while the UE 120 is operating in the SUL mode). For example, the UE 120 may be configured with a set of precoding matrices that can be indicated by respective TPMI values. In some aspects, a first precoding matrix (e.g., associated with TPMI index 0) may be for non-coherent UL MIMO transmission, and a second precoding matrix (e.g., associated with TPMI index 1) and/or a third precoding matrix (e.g., associated with TPMI index 2) may be for coherent UL MIMO transmission. Accordingly, if TPMI index 1 or 2 is indicated for the UE 120, the UE 120 may determine that the BS 110 is expecting the UE 120 to perform coherent UL MIMO transmission (e.g., using the precoding matrix associated with TPMI index 1 or 2).

Based at least in part on the above information included in the SUL configuration information and/or in the UE capability information, the UE 120 may determine that the BS 110 has configured the UE 120 to operate in the SUL mode and/or that the BS 110 expects to receive coherent UL MIMO transmissions from the UE 120 during the data communication, including while the UE 120 is operating in the SUL mode. For example, the UE 120 may determine that UE 120 is configured to perform coherent UL MIMO transmission, while operating in the SUL mode, based at least in part on a determination that the network supports SUL (e.g., based at least in part on the inclusion of the UplinkTxSwitchRequest-r16 information element in a UE capability request message); that the UE 120 reported (e.g., in UE capability information) one or more band combinations that support SUL; that the UE 120 indicated (e.g., in UE capability information) support for coherent UL MIMO in at least one band of the band combinations that support SUL; that the BS 110 is capable of triggering SUL (e.g., Tx chain switching) via DCI-based grants (e.g., an RRC configuration configures UplinkTxSwitching-r16 and UplinkTxSwitchingOption-r16 information elements); and/or that the UE 120 is configured to perform UL MIMO transmission (e.g., in a two-layer configuration) on a MIMO-capable band (e.g., as indicated by a TPMI). These factors may indicate that maintaining phase coherence between two TX chains of the UE 120 is critical to maintaining a level of performance, and thus, TX switching and subsequent retuning of a PLL would cause performance degradation on a carrier (e.g., because a constant phase difference is not maintained between the two TX chains).

Accordingly, based at least in part on determining that the BS 110 expects to receive coherent UL MIMO transmissions from the UE 120 while the UE 120 is operating in the SUL mode, the UE 120 may determine whether the UE 120 can adequately perform coherent UL MIMO transmission while the UE 120 is operating in the SUL mode. For instance, the UE 120 may determine whether the UE 120 can adequately maintain a substantially constant phase difference between a first phase associated with a first TX chain utilized to transmit in a first frequency band (e.g., the n78 band) and a second phase associated with a second TX chain utilized to transmit in a second frequency band (e.g., the n78 band). In some aspects, the UE 120 may determine that the UE 120 may not be able to maintain the substantially constant phase difference between the first phase and the second phase because, for example, while retuning a PLL associated with the second TX chain, the PLL may lock on to a random phase. As a result, the UE 120 may determine that, instead of performing coherent UL MIMO transmission, the UE 120 should perform non-coherent UL MIMO transmission, while the UE 120 is operating in the SUL mode.

Based at least in part on determining that the UE 120 may perform non-coherent UL MIMO transmission while the UE 120 is operating in the SUL mode, the UE 120 may determine that the BS 110 may not adequately receive uplink communications from the UE 120 because the BS 110 expects to receive coherent UL MIMO transmissions from the UE 120 during the data communication, including while the UE 120 is operating in the SUL mode. To avoid such a situation, as shown by reference number 540, the UE 120 may perform a tracking area update. For example, the UE 120 may transmit a tracking update (e.g., a tracking update message). The UE 120 may perform the tracking area update in order to cause the BS 110 to transmit a query (e.g., re-query) associated with capabilities of the UE 120.

Accordingly, based at least in part on the UE 120 performing the tracking area update, as shown by reference number 550, the UE 120 may receive a query from the BS 110 associated with capabilities of the UE 120 (e.g., a UE capability request message). In other words, based at least in part on the UE 120 performing the tracking area update, the BS 110 may transmit, and the UE 120 may receive, a query for the UE 120 to inform the BS 110 of capabilities of the UE 120 while conducting the data communication between the UE 120 and the BS 110.

As shown by reference number 560, based at least in part on receiving the query, the UE 120 may transmit (e.g., along with an indication of supported SUL band pairs) an updated coherence capability indication associated with an updated coherence capability of the UE 120 (e.g., in a UE capability information message). In some aspects, the updated coherence capability indication may serve to update the coherence capability previously indicated by the UE 120 via the previous coherence capability indication. In some aspects, the updated coherence capability indication may indicate that the UE 120 is unable to perform coherent UL MIMO transmission while the UE 120 is operating in the SUL mode and that the UE 120 may perform non-coherent UL MIMO transmission while the UE 120 is operating in the SUL mode. For example, the updated coherence capability indication may indicate that the UE 120 is capable of performing (e.g., only performing) non-coherent UL MIMO transmission for a frequency band (even if the UE 120 is actually capable of performing coherent UL MIMO), associated with a band combination configured for SUL (e.g., UL switching), for which the UE 120 previously indicated coherent UL MIMO capability. As an example, the updated coherence capability indication may indicate that the UE 120 is unable to perform coherent UL MIMO transmission in the n78 band while operating in the SUL mode and that the UE 120 may perform non-coherent UL MIMO transmission in the n78 band while operating in the SUL mode.

Based at least in part on receiving the updated coherence capability indication, the BS 110 may reconfigure the UE 120 accordingly (e.g., transmit new SUL configuration information) and may no longer expect the UE 120 to perform coherent UL MIMO transmission while operating in the SUL mode. In other words, the BS 110 may expect to receive non-coherent UL MIMO transmission from the UE 120 while the UE 120 is operating in the SUL mode. In some aspects, the BS 110 may transmit an updated TPMI indication for the UE 120 to indicate that the BS 110 no longer expects the UE 120 to perform coherent UL MIMO transmission while operating in the SUL mode. For example, the BS 110 may configure the UE 120 to use a precoding matrix associated with TPMI index 0 (e.g., a precoding matrix for non-coherent MIMO transmission), as described above.

Thus, the UE 120 may communicate (e.g., transmit) non-coherent MIMO transmissions on a frequency band (e.g., the n78 band) of an SUL band pair while operating in the SUL mode (e.g., by performing coherent UL MIMO transmission in the frequency band). Accordingly, by dynamically updating the coherence capability of the UE 120, when the UE 120 performs non-coherent UL MIMO transmission while operating in the SUL mode, the BS 110 may continue to adequately receive the uplink communications from the UE 120, and the data communication between the BS 110 and the UE 120 may continue without interruption.

In some aspects, the UE 120 may be enabled to support coherent UL MIMO transmission while operating in the SUL mode. As discussed above, based at least in part on determining that the network supports SUL operation, the UE 120 may transmit (i) information identifying the one or more SUL band pairs supported by the UE 120 and (ii) the coherence capability indication indicating the capability of the UE 120 to perform coherent UL MIMO transmission in a given frequency band (e.g., the n78 band) associated with the one or more SUL band pairs.

In some aspects, alternatively, based at least in part on determining that the network supports SUL operation, the UE 120 may transmit (i) information identifying the one or more SUL band pairs supported by the UE 120 and (ii) a respective coherence capability indication associated with a respective frequency band of each of the one or more SUL band pairs. Here, the respective coherence capability indications indicate whether the UE 120 is capable of performing coherent UL MIMO transmission with respect to a frequency band that supports UL MIMO (e.g., a TDD band) of each of the one or more SUL band pairs. For example, a coherence capability indication may indicate that the UE 120 is capable of performing coherent UL MIMO transmission for a frequency band (e.g., that supports UL MIMO) of a first SUL band pair from among the one or more SUL band pairs. As another example, a coherence capability indication may indicate that the UE is not capable of performing coherent UL MIMO transmission for a frequency band of a second SUL band pair from among the one or more SUL band pairs. In this way, the UE 120 may indicate (e.g., tag) the MIMO parameters for a MIMO-capable band (e.g., a TDD band) of an SUL band pair reported by the UE 120 (e.g., in an ULTxSwitchingBandPair information element). The MIMO parameters may indicate a quantity of MIMO layers supported by the UE 120 as well as a coherence type (e.g., coherent or non-coherent) supported by the UE 120 for transmission in a PUSCH in the SUL mode.

As indicated above, FIG. 5 is provided as an example. Other examples may differ from what is described with respect to FIG. 5.

Figure 6:
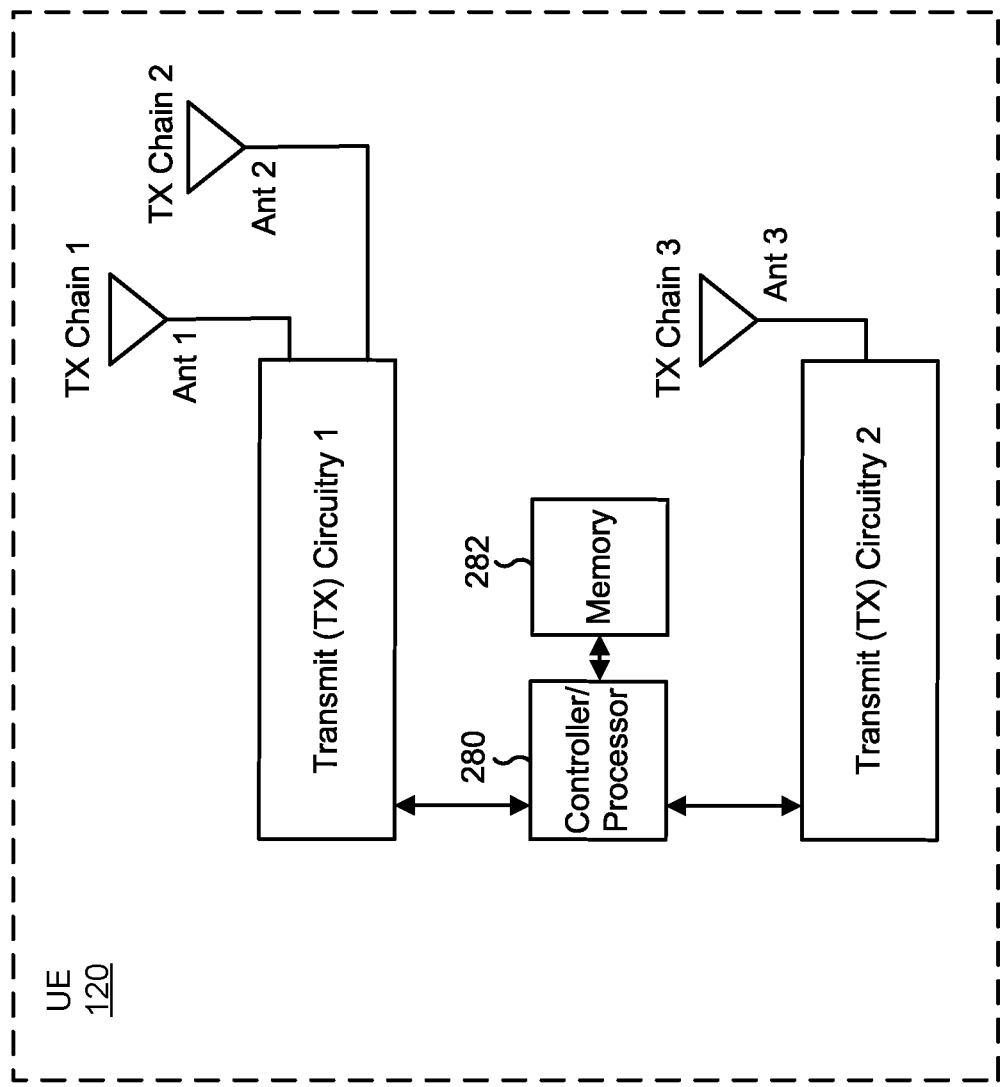

FIG. 6 is a diagram illustrating an example 600 associated with operation in an SUL mode, in accordance with the present disclosure. In some aspects, a coherence capability indication, as described above, may be based at least in part on a transceiver design associated with the UE 120. For instance, as shown in example 600, the UE 120 may include a transceiver design having three TX chains, shown as TX chain 1, TX chain 2, and TX chain 3. TX chain 1 may be associated with antenna 1 (e.g., Ant 1), TX chain 2 may be associated with antenna 2 (e.g., Ant 2), and TX chain 3 may be associated with antenna 3 (e.g., Ant 3). In some aspects, TX circuitry 1 may include a first PLL and supporting circuitry including, for example, a frequency source, multipliers, digital-to-analog converters, amplifiers, filters, switches, or the like associated with utilizing TX chain 1 and TX chain 2. Similarly, TX circuitry 2 may include a second PLL and supporting circuitry including, for example, a frequency source, multipliers, digital-to-analog converters, amplifiers, filters, switches, or the like associated with transmissions utilizing TX chain 3.

In some aspects, in the transceiver design associated with the UE 120, two PLLs may drive three TX chains (as shown). In some aspects, in the transceiver design associated with the UE 120, two PLLs may drive two TX chains.

In some aspects, the UE 120 may determine a coherence capability of the UE 120 by determining whether a transceiver design provides a first transmission chain for transmission in a first frequency band and a plurality of transmission chains for uplink MIMO transmission in a second frequency band, as exemplified below. In some aspects, a coherence capability of the UE 120 is based at least in part on an ability of a transmission chain, in a transceiver design, to support a particular frequency band, as exemplified below.

In some aspects, the first SUL band pair may include the n1 band and the n78 band, and the second SUL band pair may include the n3 band and the n78 band. TX circuitry 1 and TX circuitry 2 may be configured such that TX chain 1, TX chain 2, and TX chain 3 may be utilized to transmit in the n78 band (e.g., support the n78 band). Further, TX circuitry 1 may be configured such that TX chain 1 may be utilized to transmit in the n3 band (e.g., support the n3 band). Furthermore, TX circuitry 2 may be configured such that TX chain 3 may be utilized to transmit in the n1 band (e.g., support the n1 band).

Based at least in part on such a transceiver design, the UE 120 may determine that when supporting the SUL band pair including the n1 band and the n78 band, the UE 120 may utilize TX circuitry 2 to transmit in the n1 band via TX chain 3 and may utilize TX circuitry 1 to transmit in the n78 band via TX chain 1 and TX chain 2. In this case, the UE 120 may determine that the UE 120 may not need to tune the first PLL to a first phase and to retune the first PLL to a different second phase because TX chain 1 and TX chain 2 are transmitting in the n78 band. As a result, the UE 120 may determine that the UE 120 may perform coherent UL MIMO transmission in the SUL mode while supporting the SUL band pair including the n1 band and the n78 band.

Further, the UE 120 may determine that when supporting the SUL band pair including the n3 band and the n78 band, the UE 120 may utilize TX circuitry 2 to transmit in the n78 band via TX chain 3 and may utilize TX circuitry 1 to transmit in the n3 band via TX chain 1 and in the n78 band via TX chain 2. In this case, the UE 120 may determine that the UE 120 may need to tune the first PLL to a first phase to transmit in the n3 band and to retune the first PLL to a different second phase to transmit in the n78 band. As a result, the UE 120 may determine that the UE 120 may not perform coherent UL MIMO transmission in the SUL mode while supporting the SUL band pair including the n3 band and the n78 band.

Based at least in part on the transceiver design, the UE 120 may transmit respective coherence capability indications (as described above) to indicate that, while operating in the SUL mode, the UE 120 may perform UL MIMO transmissions in the SUL band pair including the n1 band and the n78 band and that the UE may not perform UL MIMO transmissions in the SUL band pair including the n3 band and the n78 band.

Based at least in part on receiving the one or more SUL band pairs supported by the UE 120 and the respective coherence capability indications, the BS 110 may determine an SUL configuration for the UE 120 operating in the SUL mode. In some aspects, the SUL configuration may configure the UE 120, while operating in the SUL mode, to perform coherent UL MIMO transmission in a frequency band associated with an SUL band pair for which the UE 120 provided a coherence capability indication indicating coherence capability. In some aspects, the SUL configuration may configure the UE 120, while operating in the SUL mode, to perform non-coherent UL MIMO transmission in a frequency band associated with an SUL band pair for which the UE 120 provided a coherence capability indication indicating non-coherence capability. For example, the SUL configuration may configure the UE 120 to perform coherent UL MIMO transmission for the n78 band of the SUL band pair including the n1 band and the n78 band, and configure the UE 120 to perform non-coherent UL MIMO transmission for the n78 band of the SUL band pair including the n3 band and the n78 band.

In some aspects, the BS 110 may determine an SUL band pair that the UE 120 is to use based at least in part on one or more coherence capability indications provided by the UE 120. For example, the BS 110 may determine an SUL band pair that includes a frequency band (e.g., a TDD band) for which the UE 120 is capable of MIMO operation and supports coherence capability (e.g., to enable the UE 120 to operate using MIMO and coherence capability). That is, the BS 110 may determine an SUL configuration for the UE 120 based at least in part on a preference to configure the UE 120 to use an SUL band pair associated with a coherence capability (e.g., a MIMO-supporting band of the SUL band pair is associated with a coherence capability). In this way, the BS 110 may configure (e.g., based at least in part on a particular deployment and available neighbor cells) the UE 120 to use a band pair (e.g., an FDD band and a TDD band pair) that supports TX chain switching for SUL as well as operation in a coherent UL MIMO mode (e.g., on the TDD band).

In some aspects, the BS 110 may transmit, and the UE 120 may receive, the SUL configuration. Based at least in part on receiving the SUL configuration, the UE 120 may determine that the BS 110 expects to receive coherent UL MIMO transmissions from the UE 120 while transmitting in a MIMO-capable frequency band of an SUL band pair (e.g., including the n1 band and the n78 band) for which the UE 120 was configured to perform coherent UL MIMO transmission, and the BS 110 expects to receive non-coherent UL MIMO transmission from the UE 120 while transmitting in a MIMO-capable frequency band of an SUL band pair (e.g., including the n3 band and the n78 band) for which the UE 120 is configured to perform non-coherent UL MIMO transmission. The UE 120 may operate in the SUL mode accordingly.

In this way, the BS 110 may configure the data communication accordingly and expect to receive non-coherent UL MIMO transmissions from the UE while the UE is operating in the SUL mode. As a result, the BS 110 may adequately receive uplink communications from the UE 120 while the UE 120 is operating in the SUL mode, and the data communication between the BS 110 and the UE 120 may continue uninterrupted. Additionally, utilizing the techniques and apparatuses described herein may assist in avoiding unexpected non-coherent UL MIMO transmissions and corrective coherent UL MIMO transmissions, thereby enabling efficient utilization of network resources and UE resources.

As indicated above, FIG. 6 is provided as an example. Other examples may differ from what is described with respect to FIG. 6.

Figure 7:
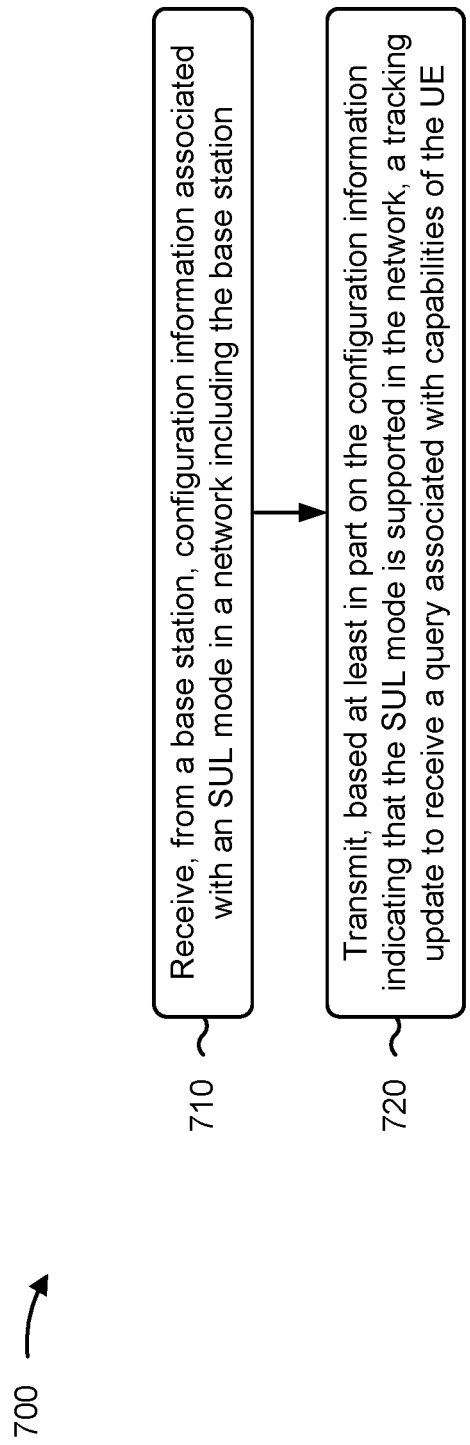
FIGS. 7-9 are diagrams illustrating example processes associated with operation in an SUL mode, in accordance with the present disclosure.

FIG. 7 is a diagram illustrating an example process 700 performed, for example, by a UE, in accordance with the present disclosure. Example process 700 is an example where the UE (e.g., UE 120) performs operations associated with a switched uplink mode.

As shown in FIG. 7, in some aspects, process 700 may include receiving, from a base station, configuration information associated with an SUL mode in a network including the base station (block 710). For example, the UE (e.g., using reception component 1002, depicted in FIG. 10) may receive, from a base station, configuration information associated with as SUL mode in a network including the base station, as described above.

As further shown in FIG. 7, in some aspects, process 700 may include transmitting, based at least in part on the configuration information indicating that the SUL mode is supported in the network, a tracking update to receive a query associated with capabilities of the UE (block 720). For example, the UE (e.g., using transmission component 1004, depicted in FIG. 10) may transmit, based at least in part on the configuration information indicating that the SUL mode is supported in the network, a tracking update to receive a query associated with capabilities of the UE, as described above.

Process 700 may include additional aspects, such as any single aspect or any combination of aspects described below and/or in connection with one or more other processes described elsewhere herein.

In a first aspect, process 700 includes transmitting information identifying one or more SUL band pairs supported by the UE when the configuration information indicates that the SUL mode is supported in the network, and transmitting a coherence capability indication indicating a capability of the UE to perform coherent uplink multiple-input multiple-output transmission in a frequency band associated with the one or more SUL band pairs.

In a second aspect, alone or in combination with the first aspect, the configuration information indicates that the base station has configured the UE to operate in the SUL mode.

In a third aspect, alone or in combination with one or more of the first and second aspects, the tracking update is a tracking area update.

In a fourth aspect, alone or in combination with one or more of the first through third aspects, process 700 includes receiving the query associated with capabilities of the UE, and transmitting an updated coherence capability indication to update a previous coherence capability indication, where the previous coherence capability indication indicates that the UE is to perform coherent uplink MIMO transmission in a frequency band, and where the updated coherence capability indication indicates that the UE is not to perform coherent uplink MIMO transmission in the frequency band.

In a fifth aspect, alone or in combination with one or more of the first through fourth aspects, process 700 includes receiving a dynamic indication from the base station to begin operating in the SUL mode.

In a sixth aspect, alone or in combination with one or more of the first through fifth aspects, process 700 includes performing coherent uplink MIMO transmission, while operating in the SUL mode, over a physical uplink shared channel.

In a seventh aspect, alone or in combination with one or more of the first through sixth aspects, process 700 includes determining, based at least in part on a transmit precoding matrix indicator, whether the base station is expecting the UE to perform coherent MIMO transmission in a frequency band associated with the SUL mode.

In an eighth aspect, alone or in combination with one or more of the first through seventh aspects, process 700 includes communicating, when operating in the SUL mode, utilizing an SUL band pair including a first frequency band and a second frequency band, the communicating including performing coherent uplink MIMO transmission in the second frequency band.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
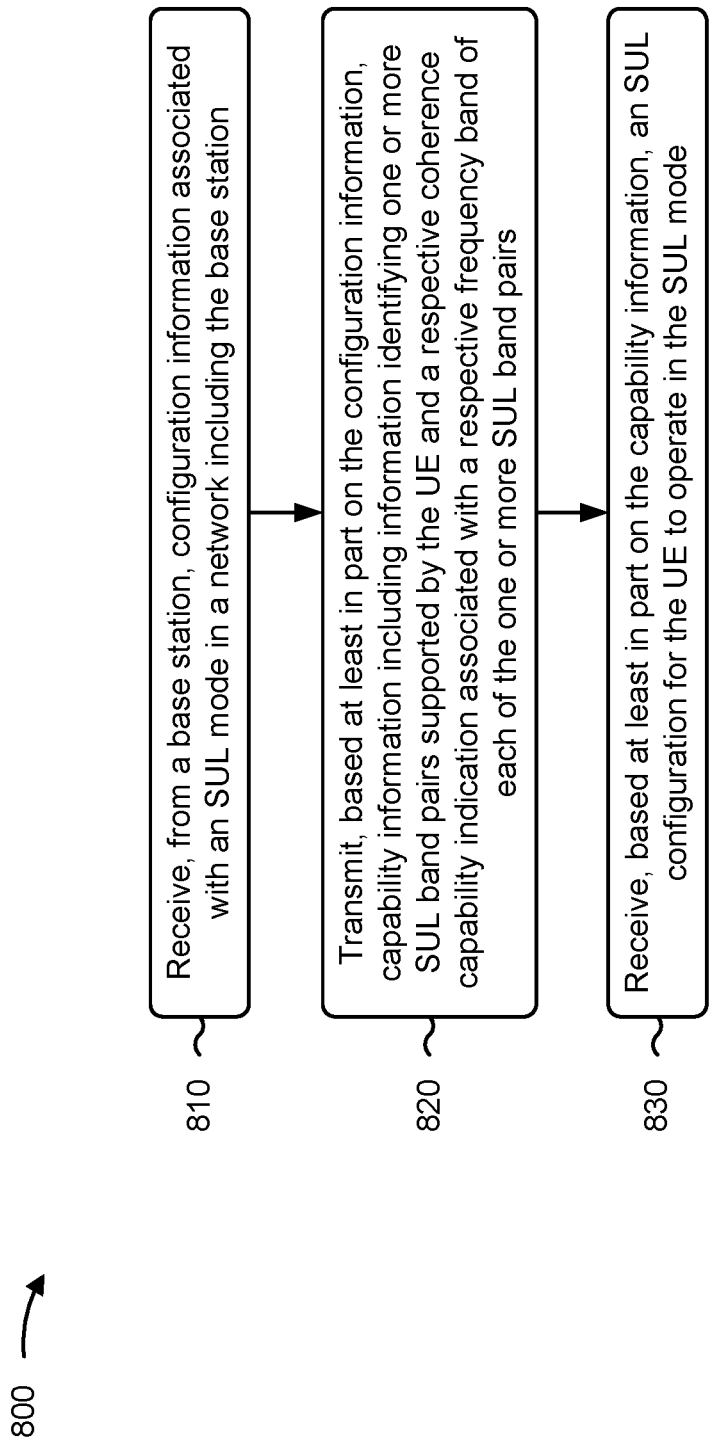

FIG. 8 is a diagram illustrating an example process 800 performed, for example, by a UE, in accordance with the present disclosure. Example process 800 is an example where the UE (e.g., UE 120) performs operations associated with a switched uplink mode.

As shown in FIG. 8, in some aspects, process 800 may include receiving, from a base station, configuration information associated with an SUL mode in a network including the base station (block 810). For example, the UE (e.g., using reception component 1002, depicted in FIG. 10) may receive, from a base station, configuration information associated with an SUL mode in a network including the base station, as described above.

As further shown in FIG. 8, in some aspects, process 800 may include transmitting, based at least in part on the configuration information, capability information including information identifying one or more SUL band pairs supported by the UE and a respective coherence capability indication associated with a respective frequency band of each of the one or more SUL band pairs (block 820). For example, the UE (e.g., using transmission component 1004, depicted in FIG. 10) may transmit, based at least in part on the configuration information, capability information including information identifying one or more SUL band pairs supported by the UE and a respective coherence capability indication associated with a respective frequency band of each of the one or more SUL band pairs, as described above.

As further shown in FIG. 8, in some aspects, process 800 may include receiving, based at least in part on the capability information, an SUL configuration for the UE to operate in the SUL mode (block 830). For example, the UE (e.g., using reception component 1002, depicted in FIG. 10) may receive, based at least in part on the capability information, an SUL configuration for the UE to operate in the SUL mode, as described above.

Process 800 may include additional aspects, such as any single aspect or any combination of aspects described below and/or in connection with one or more other processes described elsewhere herein.

In a first aspect, a coherence capability indication indicates whether the UE is capable of performing coherent uplink MIMO transmission in a frequency band that supports MIMO of an SUL band pair of the one or more SUL band pairs.

In a second aspect, alone or in combination with the first aspect, process 800 includes determining a coherence capability of the UE based at least in part on a transceiver design associated with the UE.

In a third aspect, alone or in combination with one or more of the first and second aspects, process 800 includes determining a coherence capability of the UE by determining whether a transceiver design associated with the UE provides a first transmission chain for transmission in a first frequency band and a plurality of transmission chains for uplink multiple-input multiple-output transmission in a second frequency band.

In a fourth aspect, alone or in combination with one or more of the first through third aspects, a coherence capability of the UE is based at least in part on an ability of a transmission chain, in a transceiver design associated with the UE, to support a frequency band.

In a fifth aspect, alone or in combination with one or more of the first through fourth aspects, the SUL configuration indicates an SUL band pair, from among the one or more SUL band pairs, in which the UE is to perform uplink MIMO transmission.

In a sixth aspect, alone or in combination with one or more of the first through fifth aspects, process 800 includes receiving a dynamic indication from the base station to begin operating in the SUL mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
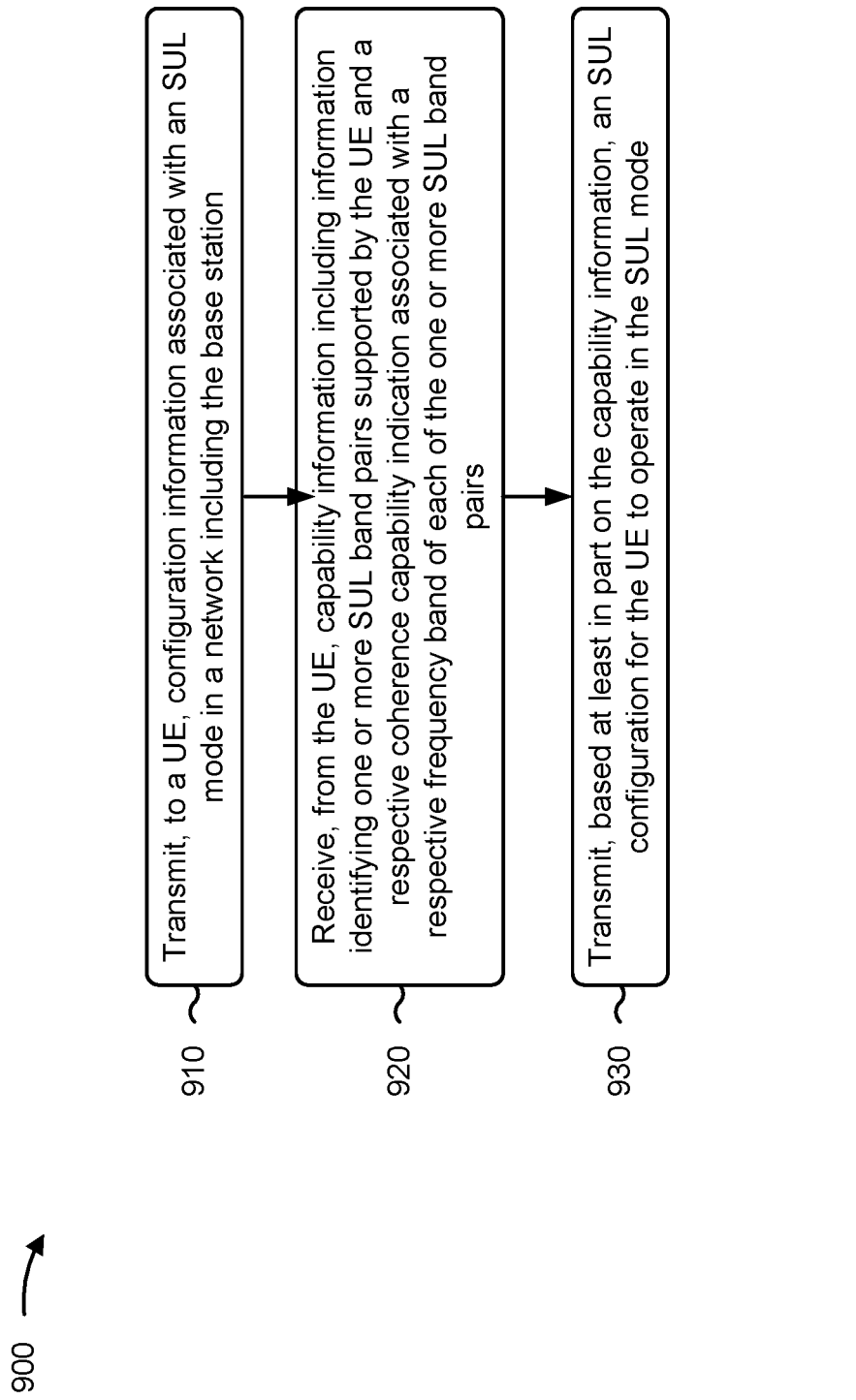

FIG. 9 is a diagram illustrating an example process 900 performed, for example, by a base station, in accordance with the present disclosure. Example process 900 is an example where the base station (e.g., base station 110) performs operations associated with a switched uplink mode.

As shown in FIG. 9, in some aspects, process 900 may include transmitting, to a UE, configuration information associated with an SUL mode in a network including the base station (block 910). For example, the base station (e.g., using transmission component 1104, depicted in FIG. 11) may transmit, to a UE, configuration information associated with an SUL mode in a network including the base station, as described above.

As further shown in FIG. 9, in some aspects, process 900 may include receiving, from the UE, capability information including information identifying one or more SUL band pairs supported by the UE and a respective coherence capability indication associated with a respective frequency band of each of the one or more SUL band pairs (block 920). For example, the base station (e.g., using reception component 1102, depicted in FIG. 11) may receive, from the UE, capability information including information identifying one or more SUL band pairs supported by the UE and a respective coherence capability indication associated with a respective frequency band of each of the one or more SUL band pairs, as described above.

As further shown in FIG. 9, in some aspects, process 900 may include transmitting, based at least in part on the capability information, an SUL configuration for the UE to operate in the SUL mode (block 930). For example, the base station (e.g., using transmission component 1104, depicted in FIG. 11) may transmit, based at least in part on the capability information, an SUL configuration for the UE to operate in the SUL mode, as described above.

Process 900 may include additional aspects, such as any single aspect or any combination of aspects described below and/or in connection with one or more other processes described elsewhere herein.

In a first aspect, a coherence capability indication indicates whether the UE is capable of performing coherent uplink MIMO transmission in a frequency band that supports MIMO of an SUL band pair of the one or more SUL band pairs.

In a second aspect, alone or in combination with the first aspect, a coherence capability of the UE is based at least in part on a transceiver design associated with the UE.

In a third aspect, alone or in combination with one or more of the first and second aspects, process 900 includes determining, based at least in part on the capability information, the SUL configuration for the UE, the SUL configuration indicating an SUL band pair, from among the one or more SUL band pairs, in which the UE is to perform uplink MIMO transmission.

In a fourth aspect, alone or in combination with one or more of the first through third aspects, process 900 includes determining the SUL configuration based at least in part on a preference to configure the UE to use an SUL band pair associated with a coherence capability indication that indicates that the UE is capable of performing coherent uplink MIMO transmission in a frequency band that supports MIMO of the SUL band pair.

In a fifth aspect, alone or in combination with one or more of the first through fourth aspects, process 900 includes transmitting a dynamic indication to the UE to begin operating in the SUL mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
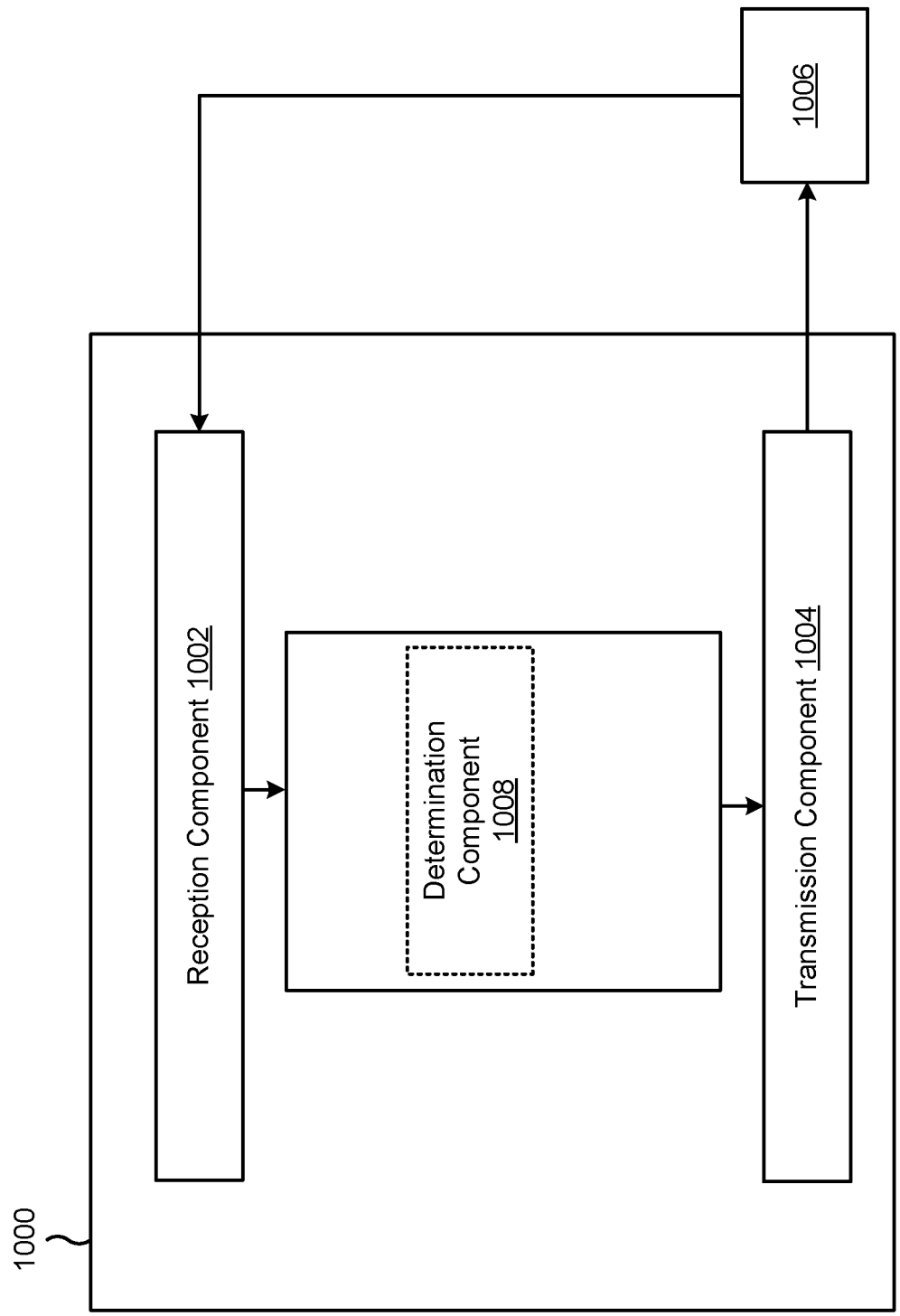
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a base station, configuration information associated with an SUL mode in a network including the base station. The transmission component 1004 may transmit, based at least in part on the configuration information indicating that the SUL mode is supported in the network, a tracking update to receive a query associated with capabilities of the apparatus 1000.

The transmission component 1004 may transmit information identifying one or more SUL band pairs supported by the apparatus 1000 when the configuration information indicates that the SUL mode is supported in the network. The transmission component 1004 may transmit a coherence capability indication indicating a capability of the apparatus 1000 to perform coherent uplink MIMO transmission in a frequency band associated with the one or more SUL band pairs. The reception component 1002 may receive the query associated with capabilities of the apparatus 1000.

The transmission component 1004 may transmit an updated coherence capability indication to update a previous coherence capability indication. In some aspects, the previous coherence capability indication indicates that the apparatus 1000 is to perform coherent uplink MIMO transmission in a frequency band, and the updated coherence capability indication indicates that the apparatus 1000 is not to perform coherent uplink MIMO transmission in the frequency band. The reception component 1002 may receive a dynamic indication from the base station to begin operating in the SUL mode.

The transmission component 1004 may perform coherent uplink MIMO transmission, while operating in the SUL mode, over a physical uplink shared channel The determination component 1008 may determine, based at least in part on a transmit precoding matrix indicator, whether the base station is expecting the apparatus 1000 to perform coherent uplink MIMO transmission in a frequency band associated with the SUL mode. The transmission component 1004 may communicate, when operating in the SUL mode, utilizing an SUL band pair including a first frequency band and a second frequency band. In some aspects, the communicating may include performing coherent uplink MIMO transmission in the second frequency band.

The reception component 1002 may receive, from a base station, configuration information associated with an SUL mode in a network including the base station. The transmission component 1004 may transmit, based at least in part on the configuration information, capability information including information identifying one or more SUL band pairs supported by the apparatus 1000 and a respective coherence capability indication associated with a respective frequency band of each of the one or more SUL band pairs. The reception component 1002 may receive, based at least in part on the capability information, an SUL configuration for the apparatus 1000 to operate in the SUL mode.

The determination component 1008 may determine a coherence capability of the apparatus 1000 based at least in part on a transceiver design associated with the apparatus 1000. The determination component 1008 may determine a coherence capability of the apparatus 1000 by determining whether a transceiver design associated with the apparatus 1000 provides a first transmission chain for transmission in a first frequency band and a plurality of transmission chains for uplink MIMO transmission in a second frequency band. The reception component 1002 may receive a dynamic indication from the base station to begin operating in the SUL mode.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
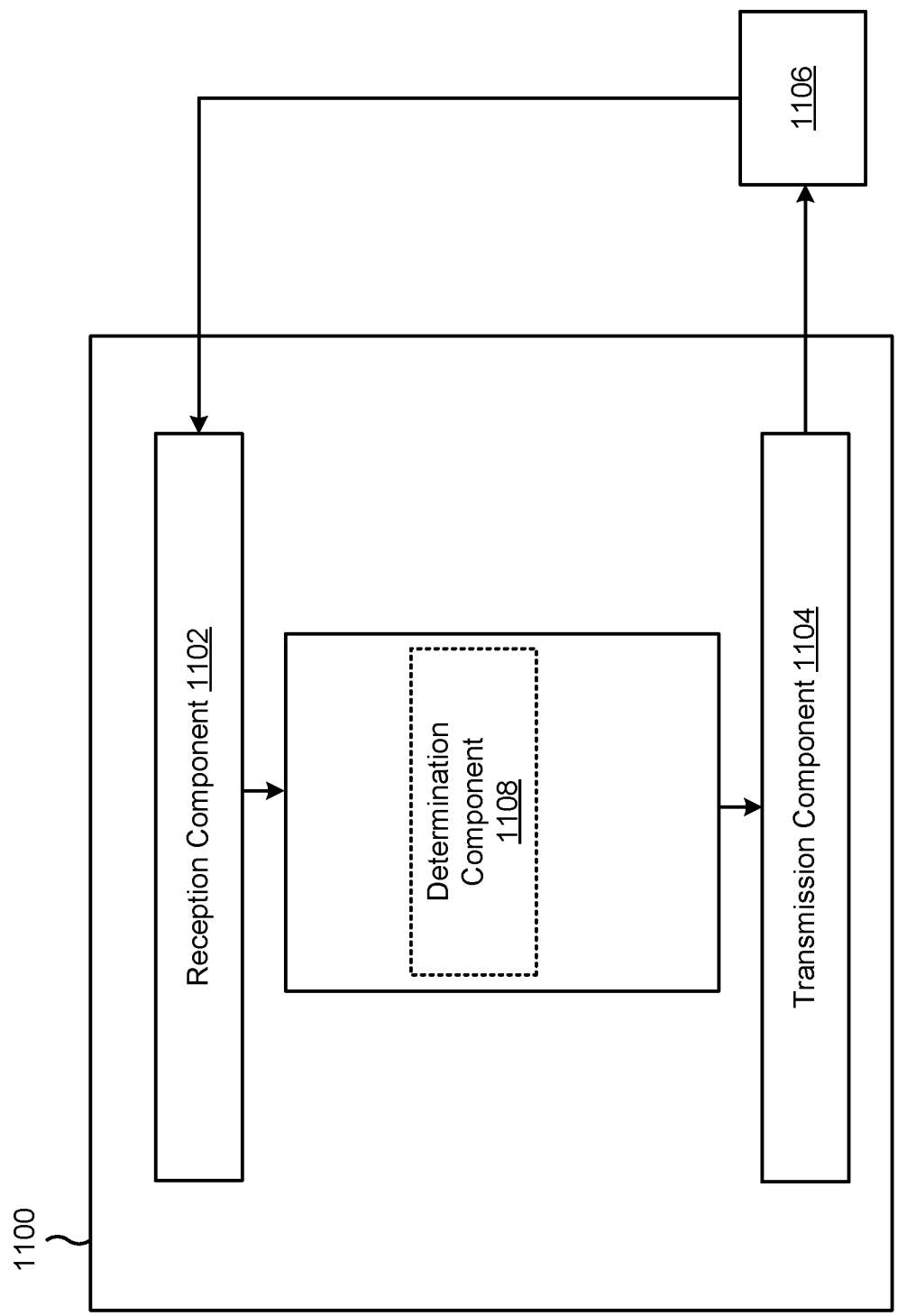

FIG. 11 is a diagram of an example apparatus 1100 for wireless communication, in accordance with the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one a determination component 1108, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit, to a UE, configuration information associated with an SUL mode in a network including the apparatus 1100. The reception component 1102 may receive, from the UE, capability information including information identifying one or more SUL band pairs supported by the UE and a respective coherence capability indication associated with a respective frequency band of each of the one or more SUL band pairs. The transmission component 1104 may transmit, based at least in part on the capability information, an SUL configuration for the UE to operate in the SUL mode.

The determination component 1108 may determine, based at least in part on the capability information, the SUL configuration for the UE, the SUL configuration indicating an SUL band pair, from among the one or more SUL band pairs, in which the UE is to perform uplink MIMO transmission. The determination component 1108 may determine the SUL configuration based at least in part on a preference to configure the UE to use an SUL band pair associated with a coherence capability indication that indicates that the UE is capable of performing coherent uplink MIMO transmission in a frequency band that supports MIMO of the SUL band pair. The transmission component 1104 may transmit a dynamic indication to the UE to begin operating in the SUL mode.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, configuration information associated with a switched uplink (SUL) mode in a network including the base station; and transmitting, based at least in part on the configuration information indicating that the SUL mode is supported in the network, a tracking update to receive a query associated with capabilities of the UE.

Aspect 2: The method of Aspect 1, further comprising: transmitting information identifying one or more SUL band pairs supported by the UE when the configuration information indicates that the SUL mode is supported in the network; and transmitting a coherence capability indication indicating a capability of the UE to perform coherent uplink multiple-input multiple-output transmission in a frequency band associated with the one or more SUL band pairs.

Aspect 3: The method of any of Aspects 1-2, wherein the configuration information indicates that the base station has configured the UE to operate in the SUL mode.

Aspect 4: The method of any of Aspects 1-3, wherein the tracking update is a tracking area update.

Aspect 5: The method of any of Aspects 1-4, further comprising: receiving the query associated with capabilities of the UE; and transmitting an updated coherence capability indication to update a previous coherence capability indication, wherein the previous coherence capability indication indicates that the UE is to perform coherent uplink multiple-input multiple-output (MIMO) transmission in a frequency band, and wherein the updated coherence capability indication indicates that the UE is not to perform coherent uplink MIMO transmission in the frequency band.

Aspect 6: The method of any of Aspects 1-5, further comprising: receiving a dynamic indication from the base station to begin operating in the SUL mode.

Aspect 7: The method of any of Aspects 1-6, further comprising: performing coherent uplink multiple-input multiple-output transmission, while operating in the SUL mode, over a physical uplink shared channel.

Aspect 8: The method of any of Aspects 1-7, further comprising: determining, based at least in part on a transmit precoding matrix indicator, whether the base station is expecting the UE to perform coherent uplink multiple-input multiple-output transmission in a frequency band associated with the SUL mode.

Aspect 9: The method of any of Aspects 1-8, further comprising: communicating, when operating in the SUL mode, utilizing an SUL band pair including a first frequency band and a second frequency band, the communicating including performing coherent uplink multiple-input multiple-output transmission in the second frequency band.

Aspect 10: A method of wireless communication performed by a user equipment (UE), comprising: receiving, from a base station, configuration information associated with a switched uplink (SUL) mode in a network including the base station; transmitting, based at least in part on the configuration information, capability information including information identifying one or more SUL band pairs supported by the UE and a respective coherence capability indication associated with a respective frequency band of each of the one or more SUL band pairs; and receiving, based at least in part on the capability information, an SUL configuration for the UE to operate in the SUL mode.

Aspect 11: The method of Aspect 10, wherein a coherence capability indication indicates whether the UE is capable of performing coherent uplink multiple-input multiple-output (MIMO) transmission in a frequency band that supports MIMO of an SUL band pair of the one or more SUL band pairs.

Aspect 12: The method of any of Aspects 10-11, further comprising: determining a coherence capability of the UE based at least in part on a transceiver design associated with the UE.

Aspect 13: The method of any of Aspects 10-12, further comprising: determining a coherence capability of the UE by determining whether a transceiver design associated with the UE provides a first transmission chain for transmission in a first frequency band and a plurality of transmission chains for uplink multiple-input multiple-output transmission in a second frequency band.

Aspect 14: The method of any of Aspects 10-13, wherein a coherence capability of the UE is based at least in part on an ability of a transmission chain, in a transceiver design associated with the UE, to support a frequency band.

Aspect 15: The method of any of Aspects 10-14, wherein the SUL configuration indicates an SUL band pair, from among the one or more SUL band pairs, in which the UE is to perform uplink multiple-input multiple-output transmission.

Aspect 16: The method of any of Aspects 10-15, further comprising: receiving a dynamic indication from the base station to begin operating in the SUL mode.

Aspect 17: A method of wireless communication performed by a base station, comprising: transmitting, to a user equipment (UE), configuration information associated with a switched uplink (SUL) mode in a network including the base station; receiving, from the UE, capability information including information identifying one or more SUL band pairs supported by the UE and a respective coherence capability indication associated with a respective frequency band of each of the one or more SUL band pairs; and transmitting, based at least in part on the capability information, an SUL configuration for the UE to operate in the SUL mode.

Aspect 18: The method of Aspect 17, wherein a coherence capability indication indicates whether the UE is capable of performing coherent uplink multiple-input multiple-output (MIMO) transmission in a frequency band that supports MIMO of an SUL band pair of the one or more SUL band pairs.

Aspect 19: The method of any of Aspects 17-18, wherein a coherence capability of the UE is based at least in part on a transceiver design associated with the UE.

Aspect 20: The method of any of Aspects 17-19, further comprising: determining, based at least in part on the capability information, the SUL configuration for the UE, the SUL configuration indicating an SUL band pair, from among the one or more SUL band pairs, in which the UE is to perform uplink multiple-input multiple-output transmission.

Aspect 21: The method of any of Aspects 17-20, further comprising: determining the SUL configuration based at least in part on a preference to configure the UE to use an SUL band pair associated with a coherence capability indication that indicates that the UE is capable of performing coherent uplink multiple-input multiple-output (MIMO) transmission in a frequency band that supports MIMO of the SUL band pair.

Aspect 22: The method of any of Aspects 17-21, further comprising: transmitting a dynamic indication to the UE to begin operating in the SUL mode.

Aspect 23: An apparatus for wireless communication at a device, comprising a processor; memory coupled with the processor; and instructions stored in the memory and executable by the processor to cause the apparatus to perform the method of one or more Aspects of Aspects 1-9.

Aspect 24: A device for wireless communication, comprising a memory and one or more processors coupled to the memory, the memory and the one or more processors configured to perform the method of one or more Aspects of Aspects 1-9.

Aspect 25: An apparatus for wireless communication, comprising at least one means for performing the method of one or more Aspects of Aspects 1-9.

Aspect 26: A non-transitory computer-readable medium storing code for wireless communication, the code comprising instructions executable by a processor to perform the method of one or more Aspects of Aspects 1-9.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 28: An apparatus for wireless communication at a device, comprising a processor; memory coupled with the processor; and instructions stored in the memory and executable by the processor to cause the apparatus to perform the method of one or more Aspects of Aspects 10-16.

Aspect 29: A device for wireless communication, comprising a memory and one or more processors coupled to the memory, the memory and the one or more processors configured to perform the method of one or more Aspects of Aspects 10-16.

Aspect 30: An apparatus for wireless communication, comprising at least one means for performing the method of one or more Aspects of Aspects 10-16.

Aspect 31: A non-transitory computer-readable medium storing code for wireless communication, the code comprising instructions executable by a processor to perform the method of one or more Aspects of Aspects 10-16.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 10-16.

Aspect 33: An apparatus for wireless communication at a device, comprising a processor; memory coupled with the processor; and instructions stored in the memory and executable by the processor to cause the apparatus to perform the method of one or more Aspects of Aspects 17-22.

Aspect 34: A device for wireless communication, comprising a memory and one or more processors coupled to the memory, the memory and the one or more processors configured to perform the method of one or more Aspects of Aspects 17-22.

Aspect 35: An apparatus for wireless communication, comprising at least one means for performing the method of one or more Aspects of Aspects 17-22.

Aspect 36: A non-transitory computer-readable medium storing code for wireless communication, the code comprising instructions executable by a processor to perform the method of one or more Aspects of Aspects 17-22.

Aspect 37: A non-transitory computer-readable medium storing a set of instructions for wireless communication, the set of instructions comprising one or more instructions that, when executed by one or more processors of a device, cause the device to perform the method of one or more Aspects of Aspects 17-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, operatively coupled to the memory, configured to:
        receive, from a base station, configuration information associated with a switched uplink (SUL) mode in a network including the base station;
        transmit, based at least in part on the configuration information indicating that the SUL mode is supported in the network, a tracking update to receive a query associated with capabilities of the UE;
        transmit information identifying one or more SUL band pairs supported by the UE when the configuration information indicates that the SUL mode is supported in the network; and
        transmit a coherence capability indication indicating a capability of the UE to perform coherent uplink multiple-input multiple-output transmission in a frequency band associated with the one or more SUL band pairs.

2. The UE of claim 1, wherein the configuration information indicates that the base station has configured the UE to operate in the SUL mode.

3. The UE of claim 1, wherein the tracking update is a tracking area update.

4. The UE of claim 1, wherein the one or more processors are further configured to:
    receive the query associated with capabilities of the UE; and
    transmit an updated coherence capability indication to update a previous coherence capability indication,
        wherein the previous coherence capability indication indicates that the UE is to perform coherent uplink multiple-input multiple-output (MIMO) transmission in a frequency band, and
        wherein the updated coherence capability indication indicates that the UE is not to perform coherent uplink MIMO transmission in the frequency band.

5. The UE of claim 1, wherein the one or more processors are further configured to:
    receive a dynamic indication from the base station to begin operating in the SUL mode.

6. The UE of claim 1, wherein the one or more processors are further configured to:
    perform coherent uplink multiple-input multiple-output transmission, while operating in the SUL mode, over a physical uplink shared channel.

7. The UE of claim 1, wherein the one or more processors are further configured to:
    determine, based at least in part on a transmit precoding matrix indicator, whether the base station is expecting the UE to perform coherent uplink multiple-input multiple-output transmission in a frequency band associated with the SUL mode.

8. The UE of claim 1, wherein the one or more processors are further configured to:

communicate, when operating in the SUL mode, utilizing an SUL band pair including a first frequency band and a second frequency band, the communicating including performing coherent uplink multiple-input multiple-output transmission in the second frequency band.

9. A method of wireless communication performed by a user equipment (UE), comprising:
receiving, from a base station, configuration information associated with a switched uplink (SUL) mode in a network including the base station;
transmitting, based at least in part on the configuration information indicating that the SUL mode is supported in the network, a tracking update to receive a query associated with capabilities of the UE;
transmitting information identifying one or more SUL band pairs supported by the UE when the configuration information indicates that the SUL mode is supported in the network; and
transmitting a coherence capability indication indicating a capability of the UE to perform coherent uplink multiple-input multiple-output transmission in a frequency band associated with the one or more SUL band pairs.

10. The method of claim 9, wherein the configuration information indicates that the base station has configured the UE to operate in the SUL mode.

11. The method of claim 9, further comprising:
receiving the query associated with capabilities of the UE; and
transmitting an updated coherence capability indication to update a previous coherence capability indication,
wherein the previous coherence capability indication indicates that the UE is to perform coherent uplink multiple-input multiple-output (MIMO) transmission in a frequency band, and
wherein the updated coherence capability indication indicates that the UE is not to perform coherent uplink MIMO transmission in the frequency band.

12. The method of claim 9, further comprising:
receiving a dynamic indication from the base station to begin operating in the SUL mode.

13. The method of claim 9, further comprising:
performing coherent uplink multiple-input multiple-output transmission, while operating in the SUL mode, over a physical uplink shared channel.

14. The method of claim 9, further comprising:
determining, based at least in part on a transmit precoding matrix indicator, whether the base station is expecting the UE to perform coherent uplink multiple-input multiple-output transmission in a frequency band associated with the SUL mode.

15. The method of claim 9, further comprising:
communicating, when operating in the SUL mode, utilizing an SUL band pair including a first frequency band and a second frequency band, the communicating including performing coherent uplink multiple-input multiple-output transmission in the second frequency band.

* * * * *